United States Patent [19]

Ford

[11] 4,350,945

[45] Sep. 21, 1982

[54] PHASE CONVERTER CONTROLLED BY D-C POWER

[76] Inventor: Horace B. Ford, 715 Nassau Bay II, Granbury, Tex. 76048

[21] Appl. No.: 232,694

[22] Filed: Feb. 9, 1981

[51] Int. Cl.³ .............................................. H02P 1/44
[52] U.S. Cl. .................................. 318/795; 318/781; 318/790
[58] Field of Search ............... 318/794, 795, 789, 790, 318/813, 816, 817, 747, 749, 781

[56] References Cited

U.S. PATENT DOCUMENTS 2,589,278   3/1952   Noodleman ........................ 318/789

Primary Examiner—David Smith, Jr.
Attorney, Agent, or Firm—Arthur F. Zobal

[57] ABSTRACT

The control relay of a phase converter for converting a three phase motor to one phase operation is operated by D-C power in order to prevent voltage fluctuations on single phase power lines from causing the starting capacitors or the motor from being destroyed. The D-C power is obtained from a rectifier having its input coupled to the secondary of a transformer. The primary of the transformer is adapted to be coupled to the windings of the motor.

The phase converter is adapted to be used with a 230 volt or 460 volt motor.

3 Claims, 7 Drawing Figures

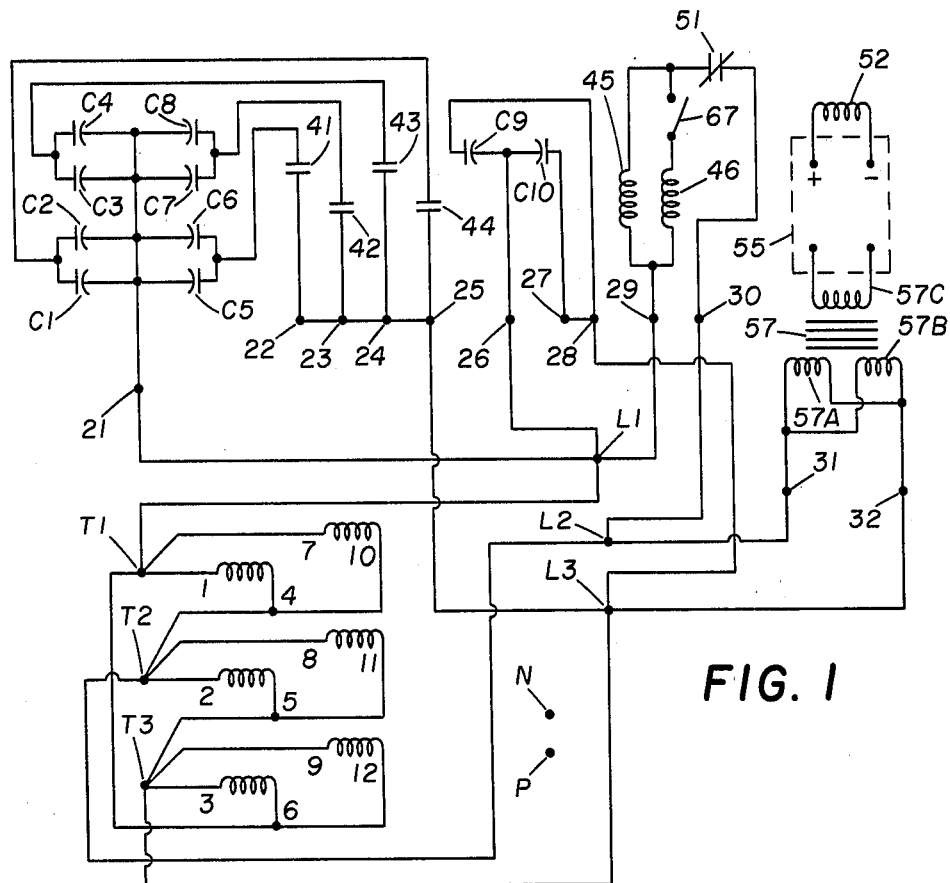
FIG. 1
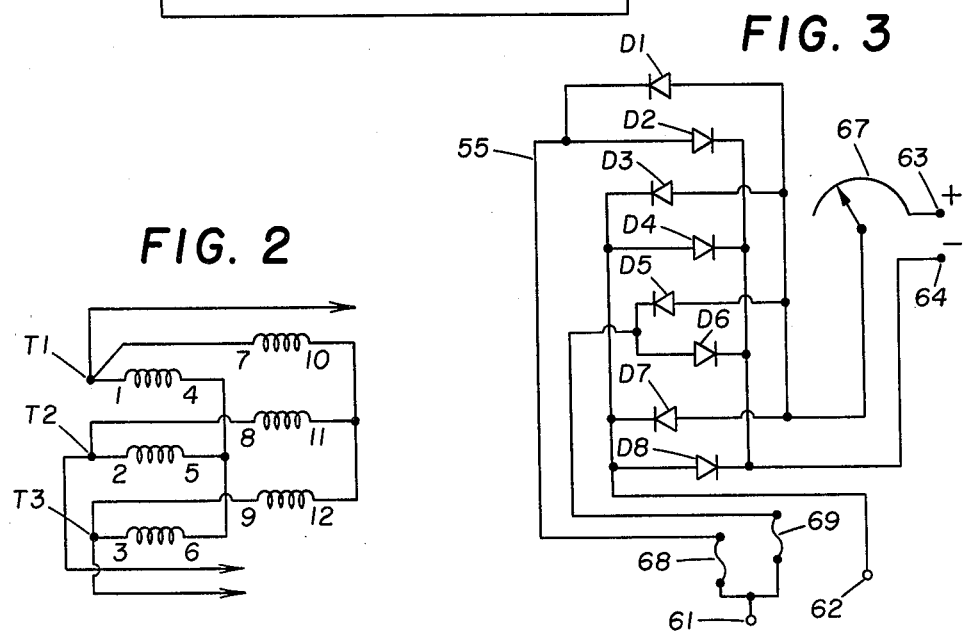
FIG. 2
FIG. 3

PHASE CONVERTER CONTROLLED BY D-C POWER

BACKGROUND OF THE INVENTION

1. Field of the Invention

The present invention relates to a phase-converter for converting a three phase motor to one phase operation.

2. Description of the Prior Art

In many rural areas, the only electrical power available is single phase power from REA lines. In many cases, large electrical motors are required, for example, for operating pump jacks of oil pumping units. Large single phase electrical motors, however, are not available, and phase converters are required for converting large three phase motors to single phase operation. In the past, the control relay for switching the large starting capacitors out of the circuit after start up of the motor have been operated by A-C power from the motor which reacts to the line voltage. Problems have occurred in that there is much voltage fluctuation on the rural lines which causes the control relay to repetitively switch the large starting capacitors in and out of the circuit. In many cases this has caused the starting capacitors or motor to be destroyed.

SUMMARY OF THE INVENTION

It is an object of the present invention to provide a phase converter for converting a three phase motor to single phase operation which employs means for operating its control relay with D-C power to prevent destruction of the starting capacitors or of the motor.

It is a further object of the present invention to provide a phase converter which can be used with three phase motors operated at different voltages.

BRIEF DESCRIPTION OF THE DRAWINGS

FIG. 1 is an electric schematic of the dual voltage phase converter system of the present invention connected to a three phase, 230 volt, delta connected motor.

FIG. 2 is an electric schematic of the windings of a three phase, 230 volt, Y connected motor to which the phase converter system of FIG. 1 may be connected.

FIG. 3 is an electric schematic of a rectifier used in the system of FIG. 1.

DESCRIPTION OF THE PREFERRED EMBODIMENTS

Figure 4:
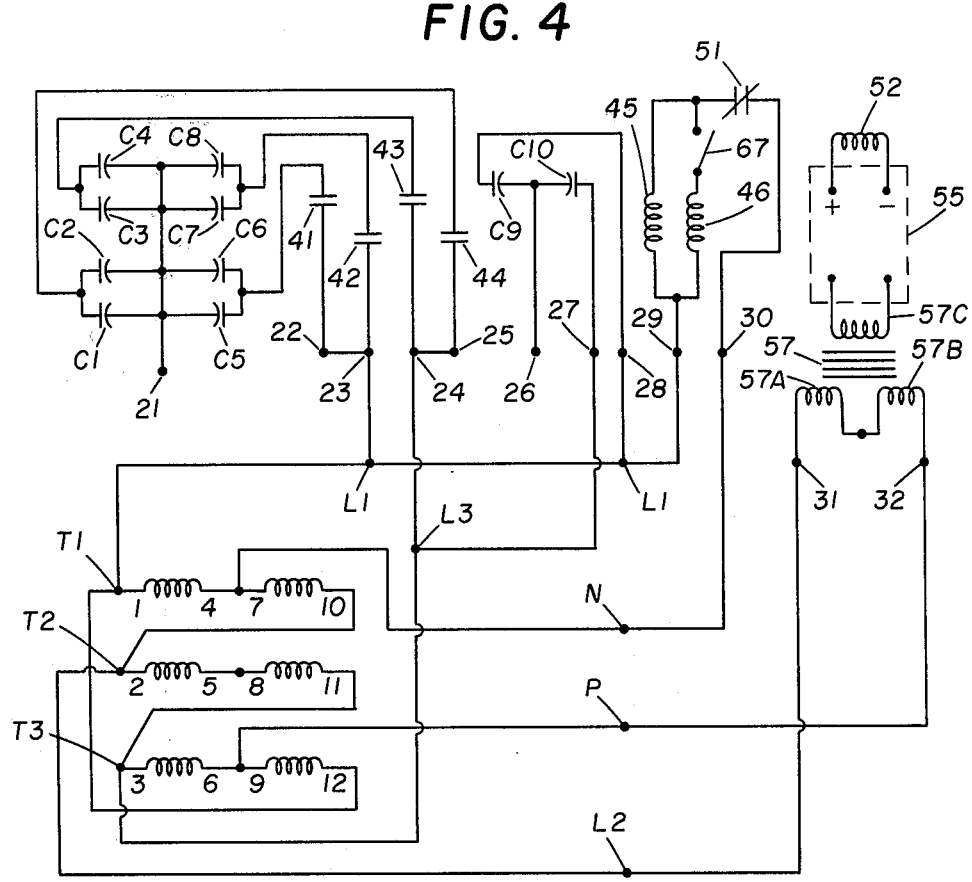
FIG. 4 is an electric schematic of the dual voltage phase converter system of the present invention connected to a three phase, 460 volt, delta connected motor.

Referring now to FIG. 1, reference characters 21-32, L1, L2, L3, N and P identify terminals of a terminal board for connecting the dual voltage static phase converter of the present invention and single phase A-C line voltage to the windings of a three phase induction motor. In the embodiment of FIG. 1, terminals N and P are not employed. By dual voltage is meant that the phase converter can operate off of two different levels of voltage for operating three phase motors having two different voltage ratings. In the embodiment disclosed, the phase converter may operate off of 230 volts or 460 volts single phase for operating either a 230 volt or 460 volt three phase, delta or Y connected induction motor. The connections shown in FIG. 1 are to a three phase, 230 volt, delta connected motor. Only the three phase stationary windings of the motor are shown in straight line form. The rotor of the motor is not illustrated. The motor is a standard motor having 12 leads designated as 1-12, which are connected as shown. The single phase A-C power lines are connected to L1 and L2 for applying single phase A-C power to the windings of the motor and to the phase converter. T1, T2, and T3 identify the motor's terminals to which the line connections would be made if the motor was to run off of three phase power. In such a case the phase converter would not be employed. L1, L2, and L3 are connected to T1, T2, and T3, respectively.

The phase converter comprises starting capacitors C1-C8, normally open contacts 41-44 controlled by coils 45 and 46 motor running capacitors C9 and C10, normally closed contacts 51 of a relay coil 52, a rectifier 55 and a transformer 57. The rectifier 55 is shown in detail in FIG. 3. The primary of the transformer 57 comprises two windings 57A and 57B and the secondary comprises a single winding 57C connected to the input leads 61 and 62 of the rectifier 55. The D-C output leads 63 and 64 of the rectifier 55 are connected to the input leads of the relay coil 52. For use with a three phase, 230 volt motor, the starting capacitors C1-C8 are connected in parallel; the running capacitors C9 and C10 are connected in parallel; and the primary windings 57A and 57B of the transformer 57 are connected in parallel. One side of the bank of starting capacitors C1-C8 is connected to terminal 21, which is connected to L1, and the other side is connected to terminal 25 by way of contacts 41-44. Terminal 25 is connected to L3. One side of the bank of capacitors C9 and C10 is connected to terminal 26 which is connected to L1, and the other side is connected to terminal 28 which is connected to L3. One side of coils 45 and 46 is connected to terminal 29 which is connected to L1. The other side of coils 45 and 46 is connected to one side of contacts 51, the other side of which is connected to terminal 30 which in turn is connected to L2. Switch 67 is a manual switch which is normally closed. Primary windings 57A and 57B are connected to terminals 31 and 32 which in turn are connected to L2 and L3, respectively. This connection provides a reference voltage for the transformer from the motor which is initially zero and builds up to 230 volts as the motor speed increases to its maximum r.p.m. upon start up.

Relay coil 52 is set to open contacts 51 when D-C voltage at its input reaches about 85 volts. As indicated above the single phase, 230 volt power lines are connected to L1 and L2. Single phase 230 volt power is applied to L1 and L2 by closing a switch, not shown. Since contacts 51 initially are closed, coils 45 and 46 are energized by the line voltage and close normally open contacts 41-44. This allows capacitors C1-C8 to apply a large starting phase shift to the windings of the motor for starting purposes. As the A-C reference voltage on the motor windings builds up, it is applied to transformer 57. This voltage is rectified to D-C by rectifier 55 and applied to relay coil 52. When the D-C voltage from rectifier 55 reaches about 85 volts (when the motor reaches about ¾ of its maximum running r.p.m.), coil 52 opens contacts 51 thereby de-energizing coils 45 and 46. This allows contacts 41-44 to open, disconnecting capacitors C1-C8 from the motor windings. Running capacitors C9 and C10 continue to apply a lesser phase shift to the windings of the motor for running the three phase motor with single phase power.

By operating relay coil 52 with D-C voltage from the rectifier 55, rather than with A-C from the motor, voltage fluctuations on the A-C lines will not affect operation of relay coil 52 in holding the contacts 51 open once the coil 52 is energized to open contacts 51. In this respect, although it takes about 85 volts to energize coil 52 to open contacts 51, after they are opened, coil 52, with D-C applied thereto, will continue to hold them open until the voltage to the input of coil 52 drops to about zero. Thus with the use of the transformer 57 and rectifier 55 to apply D-C to the relay coil 52, line voltage fluctuations will not cause the starting capacitors to be switched in and out of the circuit which would otherwise cause failure of these capacitors or failure of the motor.

In one embodiment, the starting capacitors C1-C8 are electrolytic capacitors, each having a voltage rating of 230 volts and a capacitance of 280 to 333 microfarads. The running capacitors C9 and C10 are oil filled capacitors, each having a voltage rating of about 370 volts and a capacitance of 10 to 40 microfarads. The relay comprising coil 52 and contacts 51 may be of the type manufactured by Potter and Brumfield, No. MS4AY, rated at 3 hp., 240 volts, 60 cycle. It will actuate at 70-120 volts D-C. It can be set to actuate at about 85 volts by adjustment of the potentiometer 67. The coils 45 and 46 and contacts 41-44 are known as magnetic contactors and are rated at 230 volts. The coils 45 and 46 are energized at 230 volts to close the contacts 41-44. The transformer 57 is a dual voltage transformer which may be operated off of 230 or 460 volts. The transformer 57 steps down the power to the rectifier 55 and serves as an isolation transformer. Although eight starting capacitors C1-C8 and two running capacitors C9 and C10 are disclosed, the number can vary depending on the size of the motor.

Referring to FIG. 3, the rectifier 55 will be described. It comprises two bridge rectifiers connected between input leads 61 and 63 and output leads 63 and 64. Diodes D1-D4 form one bridge and diodes D5-D8 form the other bridge. One bridge serves as a backup if the other bridge fails. Reference numeral 67 identifies a potentiometer for varying the output of the bridge. Diodes D1-D8 each are rated at 2 to 3 amps with a peak voltage rating of 200 to 300 volts. Potentiometer 67 is a 1000 ohm, 5 watt variable potentiometer. Reference numerals 68 and 69 identify fuses, each rated at three amps.

FIG. 2 illustrates the windings of a three phase, 230 volt Y connected motor to which the phase converter of FIG. 1 may be connected. T1 is connected to L1, T2 is connected to L2 and T3 is connected to L3. L1, L2, and L3 are connected to the phase converter in the same manner as shown in FIG. 1.

Referring to FIG. 4, there will be described the manner in which the dual voltage phase converter is connected to operate off of 460 volts single phase power to operate a three phase, 460 volt, delta connected motor.

Single phase 460 volt power lines are connected to L1 and L2 to apply 460 volt single phase A-C power to the motor and to the phase converter. L1 is connected to T1, L2 is connected to T2 and L3 is connected to T3. Terminal 21 is open, and the connection between terminals 23 and 24 (as seen in FIG. 1) is removed whereby starting capacitors C1-C8 are connected in a series-parallel arrangement to withstand the higher voltage. Terminal 23 is connected to L1 and terminal 24 is connected to L3. In addition terminal 26 is open and the connection between terminals 27 and 28 (as seen in FIG. 1) is removed, whereby running capacitors C9 and C10 are connected together in series to withstand the higher voltage. Terminal 27 is connected to L3 and terminal 28 is connected to L1. Terminal 29 is connected to L1 and terminal 30 is connected to terminal N which in turn is connected to leads 4 and 7 of the winding of the motor as shown. The windings 57A and 57B of the primary of the transformer are connected in series and to terminals 31 and 32, respectively. Terminal 31 is connected to L2 and terminal 32 is connected to terminal P which in turn is connected to leads 6 and 9 of the winding of the motor as shown. The phase converter of FIG. 4 operates in the same manner as the phase converter described in connection with FIG. 1 in switching the starting capacitors C1-C8 in the circuit for starting purposes and then out of the circuit. Rectifier 55 and relay coil 52 also act to prevent line voltage fluctuations from opening and closing contacts 51 thereby protecting starting capacitors C1-C8 and hence the motor.

Figure 5:
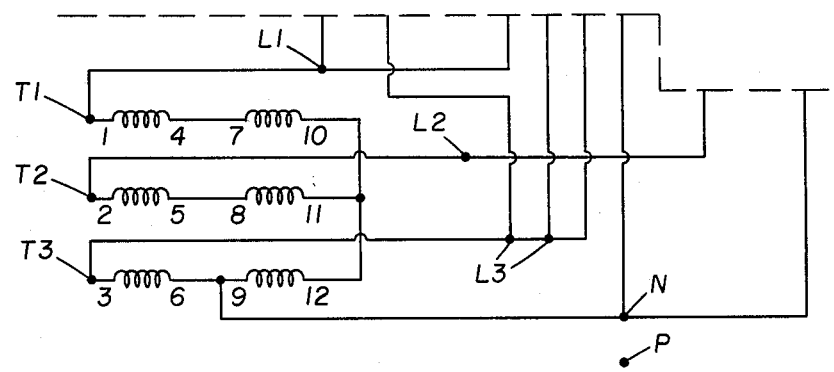
FIG. 5 is an electric schematic of the windings of a three phase, 460 volt, Y connected motor to which the phase converter system of FIG. 4 may be connected.

FIG. 5 illustrates the windings of a three phase, 460 volt Y connected motor to which the phase converter of FIG. 4 may be connected. Capacitors C1-C8 and contacts 41-44 are connected in the same manner as in FIG. 4 to connect the capacitors C1-C8 in a series-parallel arrangement. Capacitors C9 and C10 also are connected in the same manner as in FIG. 4 to connect them in series. In addition the windings 57A and 57B of the primary of transformer 57 are connected in series as shown in FIG. 4. T1 is connected to L1, T2 is connected to L2 and T3 is connected to L3. L1 is connected to terminal 23 and to terminal 27. L2 is connected to terminal 31. L3 is connected to terminal 24, terminal 28, and to terminal 29. Terminal N is connected to terminal 30, terminal 32, and to leads 6 and 9 of the winding of the motor as shown.

Figure 6:
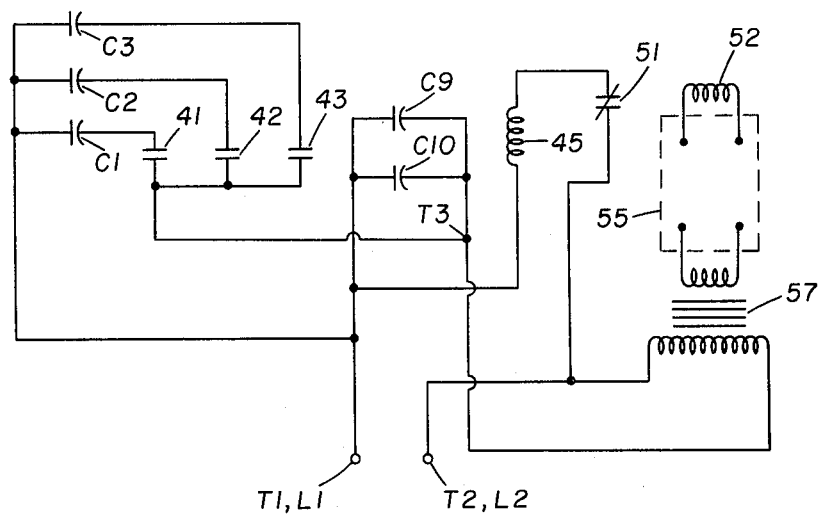
FIG. 6 is an electric schematic of the single voltage phase converter system of the present invention which may be connected to a three phase, 230 volt, Y or delta connected motor.

FIG. 6 illustrates a single voltage phase converter for a three phase 230 volt, Y or delta connected motor. In this figure, like reference characters identify like components as in FIGS. 1 and 4. Single phase A-C line power is applied to L1 and L2. T1, T2, and T3 are terminal connections of the windings (not shown) of the motor. Only three starting capacitors C1-C3 and three normally opened contacts 41-43 are shown. Starting capacitors C1-C3 are connected in parallel with one side of the capacitor bank connected to L1 and the other side connected to T3. Running capacitors C9 and C10 are connected in parallel with one side of the capacitor bank connected to L1 and the other side connected to T3. Coil 45 is connected to L1 and to normally closed contacts 51. A single coil 45 is shown for controlling normally open contacts 41-43. The other side of contacts 51 is connected to L2. One side of the primary of transformer 57 is connected to L2 and the other side is connected to T3. In FIG. 6, the transformer 57 is a single voltage transformer. The phase converter of FIG. 6 operates in the same manner as the phase converter described in connection with FIGS. 1 and 4 in switching the starting capacitors C1–C3 in the circuit for starting purposes and then out of the circuit. Rectifier 55 and relay coil 52 act to prevent line voltage fluctuations from opening and closing contacts 51 thereby protecting the starting capacitors C1–C3 and hence the motor.

Figure 7:
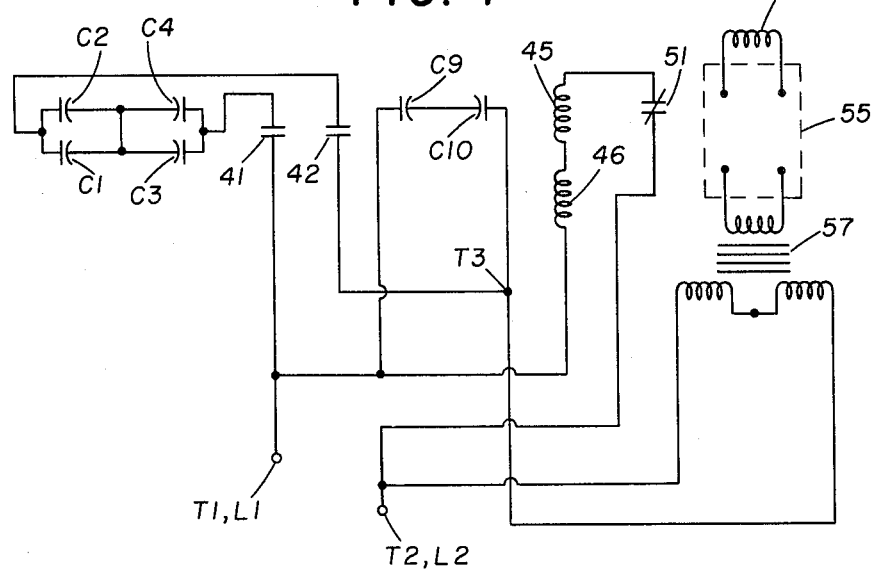
FIG. 7 is an electric schematic of the single voltage phase converter system of the present invention which may be connected to a three phase, 460 volt, Y or delta connected motor.

FIG. 7 illustrates a single voltage phase converter for a three phase 460 volt, delta connected motor. In this figure, like reference characters identify like components as in FIGS. 1 and 4. Single phase A-C power is applied to L1 and L2. T1, T2, and T3 are terminal connections of the windings (not shown) of the motor. Only four starting capacitors C1–C4 and two normally open contacts 41 and 42 are shown. Starting capacitors C1–C4 are connected in a series-parallel arrangement with one side of the capacitor bank connected to L1 by way of normally open contacts 41 and the other side connected to T3 by way of normally open contacts 42. Running capacitors C9 and C10 are connected in series with C9 being connected to L1 and C10 being connected to T3. Series connected coils 45 and 46 are employed for controlling the normally open contacts 41 and 42. Coil 46 is connected to L1. Coil 45 is connected to one side of normally closed contacts 51 and the other side of the contacts is connected to L2. The primary of transformer is connected to L2 and to T3. In FIG. 7, the transformer 57 is a single voltage transformer. The phase converter of FIG. 7 operates in the same manner as the phase converter described in connection with FIGS. 1 and 4 in switching starting capacitors C1–C4 in the circuit for starting purposes and then out of the circuit. Rectifier 55 and relay coil 52 act to prevent line voltage fluctuations from opening and closing contacts 51 thereby protecting the starting capacitors C1–C4 and hence the motor.

I claim:

1. A system for converting a three phase motor to one phase operation, the motor having three phase windings with two windings being adapted to be coupled to single phase A-C power, said system comprising:
    a first pair of terminals adapted to be coupled to a pair of windings of the motor,
    starting capacitor means coupled to said first pair of terminals by way of normally open contact means,
    a second pair of terminals adapted to be coupled to said pair of windings of the motor,
    running capacitor means coupled to said second pair of terminals,
    a third pair of terminals having normally closed relay contacts and electrical coil means coupled thereto,
    said electrical coil means closing said contact means when said electrical coil means is energized,
    a fourth pair of terminals having the primary of a transformer coupled thereto,
    said fourth pair of terminals having one terminal adapted to be coupled to the windings of the motor for applying A-C power from the motor to said primary of said transformer,
    rectifier means coupled to the secondary of said transformer for converting A-C power to D-C power,
    a relay coil coupled to the output of said rectifier means for opening said relay contacts when a predetermined level of D-C voltage is applied to said relay coil,
    said third pair of terminals being adapted to be coupled to A-C power for energizing said electrical coil means for closing said contact means such that when single phase A-C power is applied to said pair of windings of the motor, said starting capacitor means applies a starting phase shift to the windings of the motor until the D-C voltage applied to said relay coil builds up to said predetermined level, at which time said relay coil opens said relay contacts, de-energizing said electrical coil means and disconnecting said starting capacitor means from said windings of the motor.

2. A system for converting a three phase motor to one phase operation, the motor having three phase windings with two windings being adapted to be coupled to single phase A-C power, said system being capable of being operated off of A-C voltage of two different valves for operating three phase motors of two different voltage ratings, comprising:
    a plurality of starting capacitors coupled to a plurality of normally open contacts respectively,
    means for coupling said starting capacitors to a pair of windings of a three phase motor such that the total capacitance of said starting capacitors will be one of two different values,
    a plurality of running capacitors,
    means for coupling said running capacitors to said pair of windings of a three phase motor such that the total capacitance of said running capacitors will be one of two different values,
    normally closed relay contacts and electrical coil means coupled together in series,
    said electrical coil means closing said normally open contacts when said electrical coil means is energized,
    a transformer having two primary windings and a secondary winding,
    means for coupling said two primary windings of said transformer in parallel or in series to the windings of a three phase motor for applying A-C power from the motor to said primary windings of said transformer,
    rectifier means coupled to said secondary windings of said transformer for converting A-C power to D-C power,
    a relay coil coupled to the output of said rectifier means for opening said relay contacts when a predetermined level of D-C voltage is applied to said relay coil, and
    means for coupling said normally closed contacts and electrical coil means to A-C power for energizing said electrical coil means for closing said normally open contacts such that when single phase A-C power is applied to said two windings of a three phase motor, said starting capacitors apply a phase shift to the windings of the motor until the D-C voltage applied to said relay coil builds up to said predetermined level, at which time said relay coil opens said relay contacts, de-energizing said electrical coil means and disconnecting said starting capacitors from the windings of the motor.

3. A system for converting a three phase motor to one phase operation, the motor having three phase windings with two windings being adapted to be coupled to single phase A-C power, comprising:
    a plurality of starting capacitors coupled to a plurality of normally open contacts respectively,
    means for coupling said starting capacitors to a pair of windings of the motor,
    a plurality of running capacitors, means for coupling said running capacitors to said pair of windings of the motor, normally closed relay contacts and electrical coil means coupled together, said electrical coil means closing said normally open contacts when said electrical coil means is energized, a transformer having primary windings and secondary windings, means for coupling said primary windings of said transformer to the windings of the motor for applying A-C power from the motor to said primary windings of said transformer, rectifier means coupled to said secondary windings of said transformer for converting A-C power to D-C power, a relay coil coupled to the output of said rectifier means for opening said relay contacts when a predetermined level of D-C voltage is applied to said relay coil, and means for coupling said normally closed contacts and electrical coil means to A-C power for energizing said electrical coil means for closing said normally open contacts such that when single phase A-C power is applied to said two windings of the motor, said starting capacitors apply a phase shift to the windings of the motor until the D-C voltage applied to said relay coil builds up to said predetermined level, at which time said relay coil opens said relay contacts, de-energizing said electrical coil means and disconnecting said starting capacitors from the windings of the motor.

* * * * *